United States Patent [19]

Brady

[15] 3,685,632
[45] Aug. 22, 1972

[54] PNEUMATIC ARTICLE SPREADER
[72] Inventor: Dale J. Brady, Lancaster, Ohio
[73] Assignee: Anchor Hocking Corporation, Lancaster, Ohio
[22] Filed: Aug. 27, 1970
[21] Appl. No.: 67,308

[52] U.S. Cl. ..........................198/31, 198/45, 302/31
[51] Int. Cl. ........................B65g 47/26, B65g 47/00
[58] Field of Search ........302/29, 31; 198/31, 34, 20; 193/31

[56] References Cited

UNITED STATES PATENTS

| | | |
|---|---|---|
| 3,231,165 | 1/1966 | Wallin..........................302/29 |
| 3,385,490 | 5/1968 | Malmgren....................302/29 |
| 3,288,265 | 11/1966 | Smith..........................198/30 |
| 3,004,650 | 10/1961 | Pettee..........................198/34 |
| 3,433,343 | 3/1969 | Giulie..........................198/31 |
| 3,300,065 | 1/1967 | Witmer....................214/1 BE |

Primary Examiner—Richard E. Aegerter
Attorney—Wood, Herron & Evans

[57] ABSTRACT

A pneumatic spreader which arranges a series of similar articles such as glass containers moving in single line arrangement into two or more ongoing lines. In preferred form, the spreader includes an air table having a multiplicity of air outlet ports in it and side guide rails that define a transfer area on the air table. The air ports are positioned in at least a left-hand apron and a right-hand apron, the outlets in the respective aprons being directed generally downstream but angularly away from those of the other apron. As the articles pass over the air table they float on a continuous air cushion and are distributed by angulated air jets issuing from the ports into the plural ongoing lines. Almost negligible article-to-article contact occurs.

A plate-like cover is positioned over the transfer area closely above the tops of the articles so as to prevent them from tipping or falling over as they are transferred from and to the conveyors and move on the air cushion. One or more pegs block flow of articles past them and assist in the formation of defined lines.

7 Claims, 3 Drawing Figures

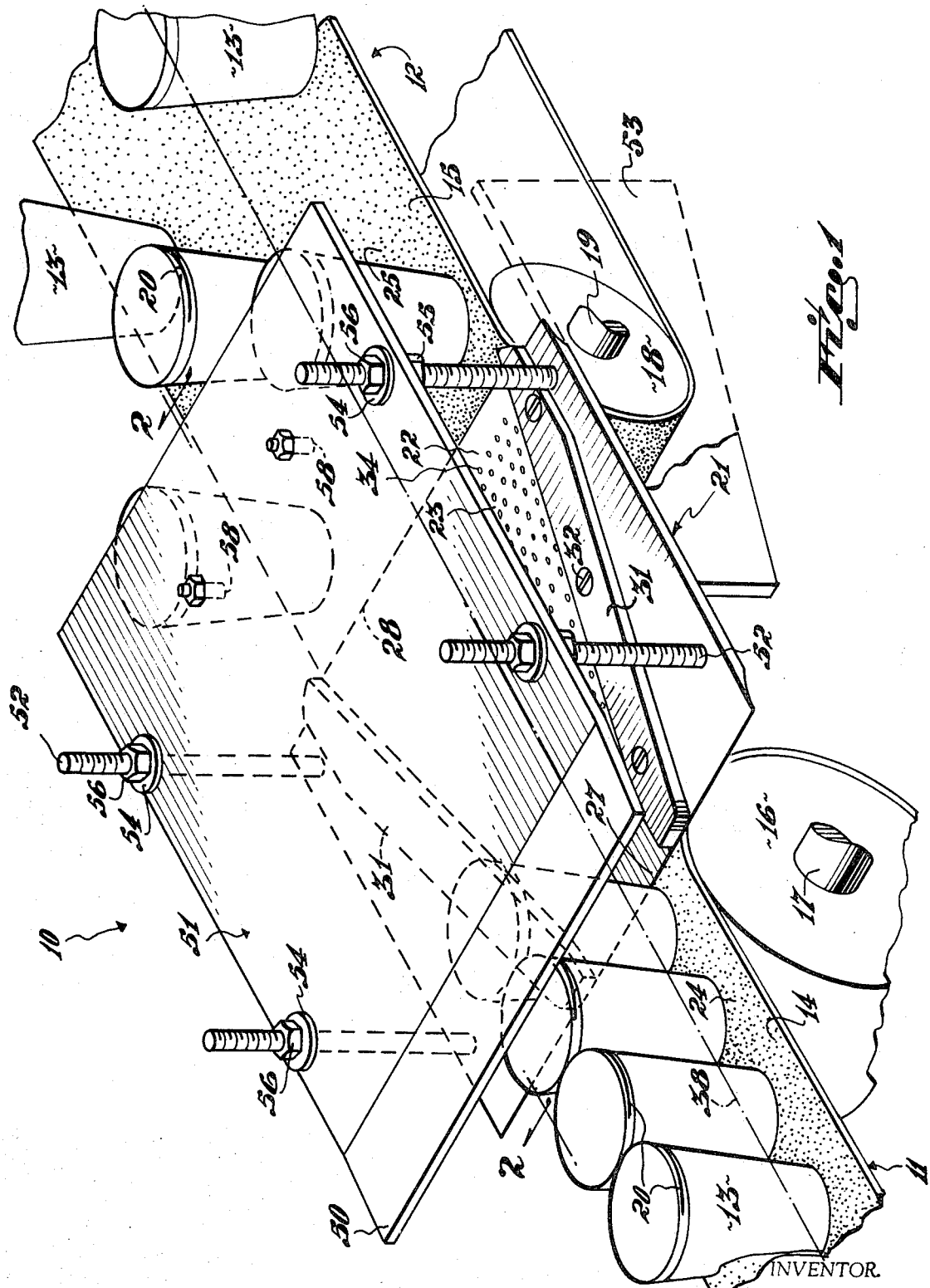

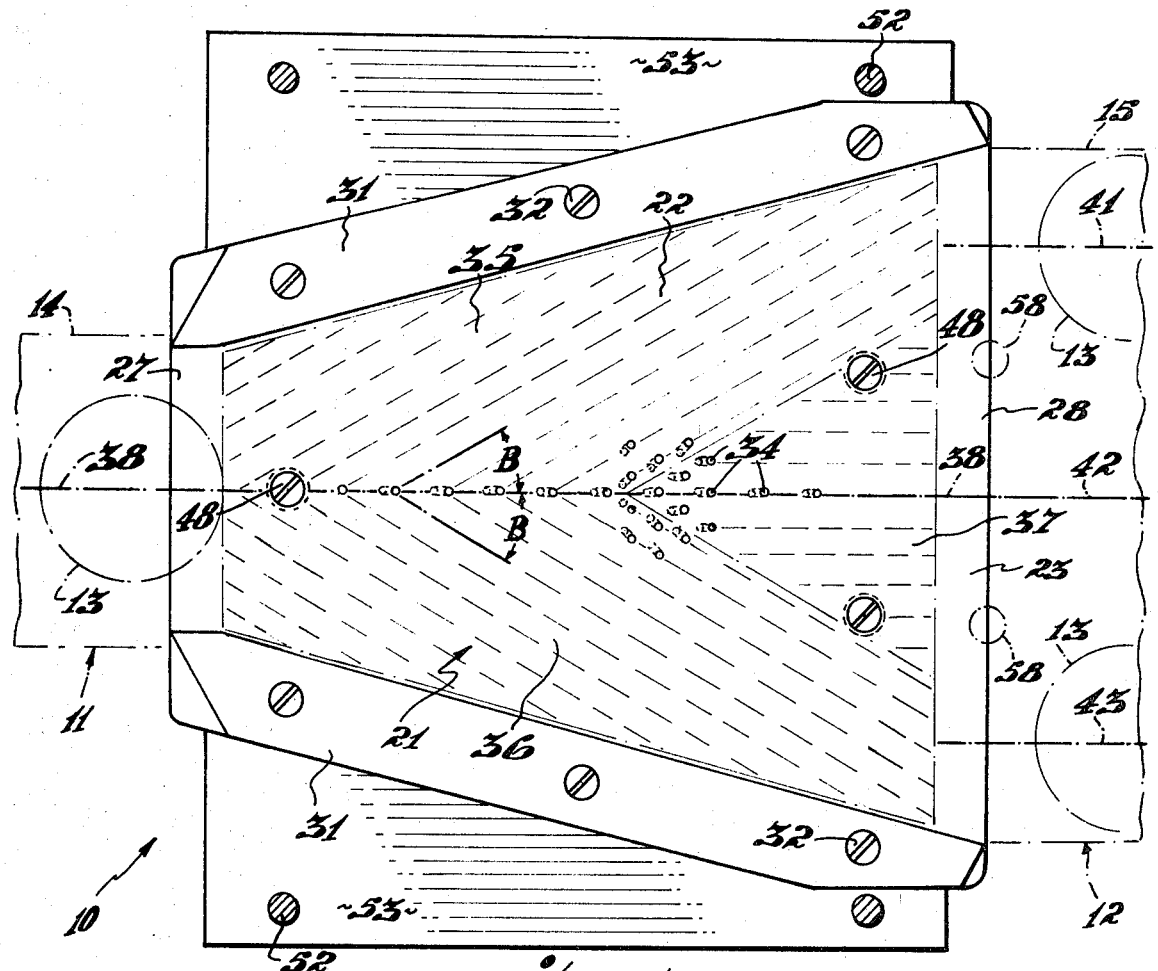
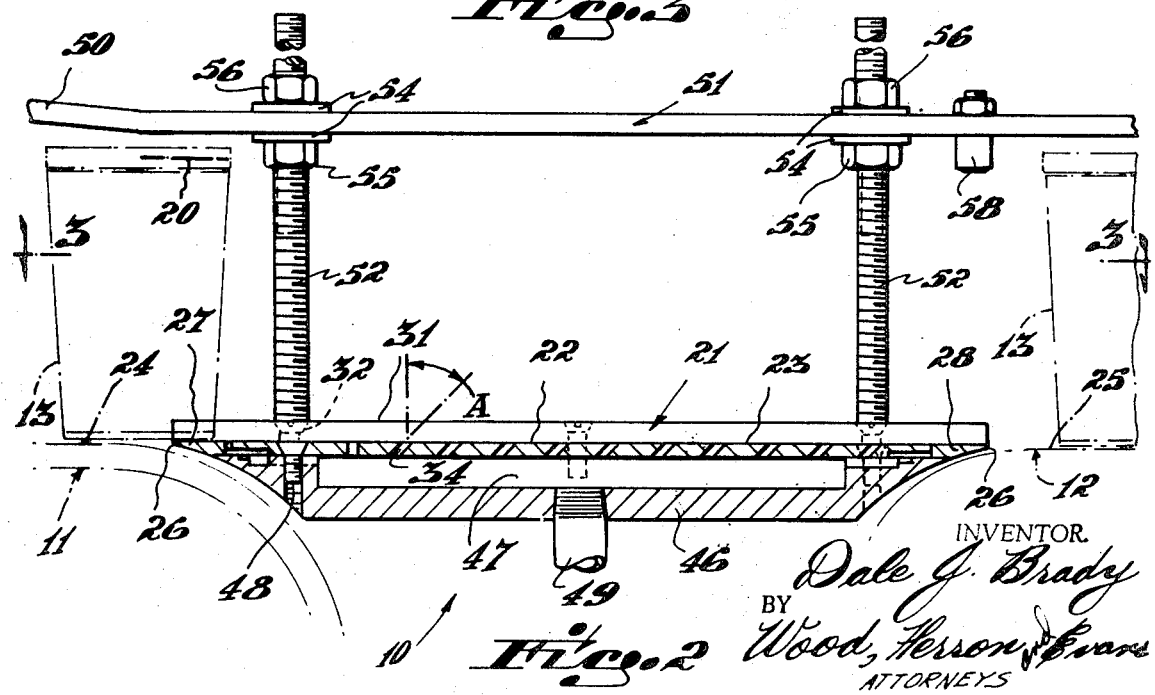

PNEUMATIC ARTICLE SPREADER

This invention relates to article handling apparatus which is particularly useful for arranging moving articles from single line or column relation into two or more lines.

There are numerous instances in the mass production of similarly sized and configured articles, e.g., glass, plastic or metal containers, drinking tumblers, tableware and the like, where a single line of moving articles is translated or arranged into multiple lines. This is necessary, for example, in directing the articles to parallel testing, decorating, labelling, filling or other stations, and in many packaging operations.

There are, of course, presently known devices which may be employed to arrange a single line of moving articles into plural lines. Such devices are best suited for use with metal articles such as tin cans.

One known type of spreader apparatus which is located between a single line conveyor and a triple line conveyor is disclosed in Bourland U.S. Pat. No. 2,472,563. That spreader includes a dead plate having two vibrating or eccentric pins dividing the downstream end of the plate into three gates or outlets. The upstream, single line conveyor feeds a continuous line of tin cans toward the center gate defined by the vibrating pins. The downstream conveyor is run at approximately one-third the rate of the upstream conveyor, hence, cans tend to collect on the dead plate. When the cans back up along the center line, additional cans moving onto the dead plate are deflected sideways by vibratory movement of the pins. The eccentric rotation of the pins provides the vibratory action which distributes the containers into two lines on either side of the center line defined between the pins.

Another type of spreader apparatus for spreading containers from a single line into three lines is disclosed in Giulie U.S. Pat. No. 3,433,343. The Guilie patent discloses a specially configured transfer plate that includes a left-hand apron and a right-hand apron and a raised central section. The central section is arcuately configured along its side edges so as to guide a can into either of two side lines. A special rejection device having a reciprocable finger is located on each side at the end of the single line conveyor. The rejection devices alternately push the cans to one side or the other of the raised central section depending on which rejection device is energized. When neither rejection device is energized the can simply passes onto the raised central section.

A third type of spreader is disclosed in Agnew, U.S. Pat. No. 3,185,277. The cans are transferred from a single upstream chute to either of two downstream chutes by means of a Y-shaped divider. Alternate cans in the incoming line, instead of being mechanically pushed into one of the two downstream chutes (as by Giulie's reciprocable fingers), are blown into the desired downstream chute by selectively actuated air nozzles.

In the production of glassware and glass containers, it is highly desirable to minimize contact of the articles with one another or with mechanical pushers. Abrading or scratching contact of the surface of glassware or glass containers can lead to reduction of strength, as well as to disfiguring. Each of the spreaders discussed above presents this disadvantage if used in connection with glass articles. In the Bourland and Giulie patents the mechanical contact required to effect separation into multiple lines (by the eccentric pins in Bourland and by the reciprocable fingers in Giulie) would cause undesirable scratching of glass surfaces. The force of the sidewise air blast needed by Agnew to push articles into the chutes creates movement of the kind which causes scratches in glass surfaces.

It has been one objective of this invention to provide a pneumatic spreader which will arrange a single line of articles into multiple lines with a minimum of article contact of the kind which would cause substantial abrasions or scratches of glassware.

It has been another objective of this invention to provide a pneumatic spreader having an air table on which glass containers float on an air cushion as they are arranged from the single line to the multiple lines, whereby they can be positioned with a minimum of force.

It has been another objective of the invention to provide minimal contact means which will prevent articles from tipping over while they are supported on the air cushion.

These objectives are attained by structure which includes an air table preferably having a multiplicity of air outlets between side guide rails that define a transfer or conveying area on the air table. The air outlets are divided into two or more aprons, the air outlets in the respective aprons being directed angularly away from those in the adjacent aprons. Articles which pass over the air table are floated on an air cushion. The angulated air jets issuing from the outlets impart sideways conveying forces which urge the ware, on the air cushion, to form the different lines with almost negligible article-to-article contact and, therefore, a minimum of abrasion.

A plate-like cover is positioned over the air table a short distance above the tops of the articles so as to prevent articles from tipping or falling over especially as they pass from the air dead plate to the downstream conveyor. One or more pegs block flow of articles past them and assist in the formation of well-defined lines. The device has no moving parts in operation.

Other objectives and advantages of this invention will be more apparent from the following description taken in conjunction with the drawings in which:

FIG. 1 is a perspective view of a preferred form of pneumatic spreader in accordance with the invention, for arranging an incoming single line of glass containers on an upstream conveyor into three lines which are delivered onto a downstream conveyor;

FIG. 2 is a longitudinal vertical section taken along line 2—2 of FIG. 1; and

FIG. 3 is a horizontal section taken along line 3—3 of FIG. 2.

In the embodiment which is shown for purposes of explanation an incoming single line of articles is arranged into three ongoing parallel lines, but it will be understood that articles can be arranged into other numbers of lines by use of the invention. In general, the incoming articles may be on a moving belt conveyor as shown, or they may be deposited on the spreader by other article handling or conveying means. Similarly, the ongoing lines of articles may be received by a single belt downstream conveyor as shown, or by separate article conveying or handling means, traveling in parallel paths or moving angularly. In general, the upstream feeding means and the downstream receiving means are called conveyors herein.

The pneumatic spreader, designated at 10, is installed between an upstream conveyor 11 and a downstream conveyor 12. Articles 13 pass from the upstream conveyor 11 through the apparatus 10 and onto the downstream conveyor 12. The articles 13 shown are tapered glass jars which have threaded necks 20 adapted to receive lids, not shown. The articles 13 are of substantially the same height and geometry, and are disposed in the same attitude or orientation as they are conveyed, that is, all are standing upright. Glass articles which taper outwardly above the base, such as those shown, present an especially difficult problem, because the rim area is highly exposed to glass-to-glass abrasion. Moreover, such articles are quite difficult to push across a prior art type dead plate because as they bunch together, due to friction on the base, the sides of the jars come together and the jars tilt or tip and tend to fall over. With the apparatus 10 of this invention, the jars 13 are conveyed from the upstream conveyor 11 to the downstream conveyor 12 without tipping over and with minimal article contact.

Upstream conveyor 11 includes a continuous loop belt 14 which passes around a drum 16 or an axle 17 at the take-off end, the rest of the conveyor not being shown. Downstream conveyor 12 includes a continuous loop belt 15 which passes around a drum 18 on axle 19 at the receiving end, the rest of the conveyor not being shown. The upstream and downstream conveyors 11 and 12 respectively are powered by drive means, not shown. The downstream conveyor 12 usually will be operated at a line speed which is only a fraction of the line speed of the upstream conveyor 11, because since its lineal dimension is filled at a slower rate than the incoming articles move. For example, if the downstream conveyor is a triple line conveyor, as illustrated in FIG. 1, it may move at a line speed of about one-third the line speed of the upstream conveyor 11. (A double line downstream conveyor may move at a line speed of about one-half the line speed of the upstream conveyor.)

The pneumatic spreader 10 includes an air table 21 positioned between the upstream and downstream conveyors 11 and 12. Table 21 includes a ported transfer plate 22 having an upper surface 23 in substantially the same horizontal plane as the conveying surfaces 24, 25 of the upstream 11 and downstream 12 conveyors, respectively. The transfer plate 22 and hence the spreader apparatus 10 is held in position relative to the conveyors 11, 12 by suitable support means such as mounting arms 53.

The transfer plate 22, as particularly illustrated in FIG. 2, is provided with a feather edge 26 at both its narrow upstream end 27 and its wide downstream end 28 to provide a smooth transition off of and onto the conveyors.

A Teflon guide rail 31 is fixed to the transfer plate 22 on each side thereof, the guide rails being fixed to the plate by screws 32. The guide rails 31, 31 cooperate with the transfer plate to define a substantially trapezoidal shaped surface over which the articles 13 are transferred, the narrow upstream end of the trapezoidal area cooperating with the single line conveyor 11 and the wide downstream end 28 of the trapezoidal area cooperating with triple line conveyor 12. The wide end 28 should be at least slightly greater in width than the combined diameters of three of the articles 13 to be discharged onto the triple line conveyor. Thus, the guide rails 31 flare outwardly from the single line conveyor 11 to the triple line conveyor 12, and thereby limit the separation or spread of the articles 13 as they are transferred from the single line conveyor to the triple line conveyor.

The transfer area of plate 21 is provided with a large plurality of holes or air outlet ports 34 which extend through the plate. (Only a few of the holes 34 are shown in FIG. 3, but their spacing and orientation in the horizontal plane is indicated by the dashed lines.) It will be particularly noted from FIG. 2 that the holes are angulated from vertical at an acute angle A of about 45° toward the downstream conveyor 12. Further, certain of the ports 34 are angulated with respect to the central longitudinal axis 38 of the plate 21. The ports on the left and right sides at the narrow or entrance end 27 (as viewed looking toward the triple line conveyor 12) are angulated to point away from the axis, so as to provide a left-hand apron 35, a right-hand apron 36. A center apron 37 is provided adjacent the wide, downstream or exit end 28, see FIG. 3. The center apron 37 is triangular in configuration with the base of the triangle being at the wide end 28 of the transfer plate 21 and the apex of the triangle pointing toward the middle of the transfer plate. In the center apron 37 the air jets are directed generally parallel to the vertical plane in which axis 38 lies. However, the ports 34 in the left-hand 35 and the right-hand 36 aprons of the transfer plate's trapezoidal shaped conveying area diverge from axis 38 toward the side rails. In the horizontal plane those ports make acute angles B of about 30°, toward the downstream conveyor. The left-hand 35 and right-hand 36 apron sections of the air jets or ports 34 are divided by a center line of ports which are not angulated in the horizontal plane.

As the articles 13 come onto the transfer plate they are supported on a continuous air cushion by the air streams or jets which issue from the ports 34. The downstream angulation of the jets conveys the articles across it, regardless of whether the articles ultimately are directed into the left-hand line 41, the center line 42, or the right-hand line 43 on the triple line conveyor 12.

A housing 46 is mounted beneath the transfer plate 21 so that the transfer plate and housing together define an air or plenum chamber 47 which feeds the ports 34. The housing 46 is fixed to the transfer plate 21 by screws 48 at suitable locations. A pressure air supply conduit 49 is threaded into the housing 46 at one end and is connected with a pressure source, not shown, at the other end.

I have found that the holes 34 may suitably be drillings of about 0.0225 inches diameter, and may be spaced on approximately ⅜ inch centers. These values are not critical and may be adjusted as article shape and weight requires.

A plate-like cover 51 is mounted above the transfer plate 21, the cover preferably being of a clear plastic or the like to permit observation of the articles 13 as they pass through the apparatus 10. The cover 51 is provided with an upwardly flared end 50 adjacent the upstream conveyor 11, and is fixed to elongated supports or bolts 52 at the corners, each of the bolts being mounted in an area 53, outside the guide rails 31. The cover 51 is sized to extend substantially over the trapezoidal shaped transfer area which is defined between the guide rails 31.

The cover 51 is vertically adjustable relative to the transfer plate 22 of the air table, and is held in position at each bolt 52 between washers 54 by a bottom nut 55 and a top nut 56. The plane of the cover 51 is made parallel to the conveying plane of the air table 21 by adjustment of the nuts 55, 56 on each of the four bolts 52. Further, cover 51 is located at a height above the conveying plane of the transfer plate 22 sufficiently greater than the height of the articles 13 to be handled such that upright articles can pass but such that articles are confined against tipping over (see FIG. 2).

The cover 51 is provided with two Nylon positioning pegs 58 which are located adjacent the wide end 28 of the transfer plate 22 between the guide rails 31 so as to divide the wide end 28 into three equal lines or widths. Positioning pegs 58 are preferably located beneath the top plate, symmetrically relative to the center axis 38 and guide rails 31, and are spaced by a transverse distance slightly greater than the width of a single article 13. The pegs extend just below the tops of the articles, and require the articles to move in lines between and around them.

In operation the pneumatic spreader apparatus 10 is preferably used with articles 13 which are of substantially the same height and which are all disposed in substantially the same attitude e.g., the glass containers should be standing up, etc. The cover 51 is adjusted by means of nuts 55, 56 to a height which is just a little greater than the height of the articles 13 as they pass over the air cushion. For example, with tapered jars as shown, the cover 51 may be positioned about ⅛ inch above their tops. This will prevent the articles 13 from tipping over.

As articles 13 are transferred off the single line conveyor by the leading feather edge 26 and move onto the transfer plate 22 they are floated on the air cushion and are conveyed by the angulation of the air jets toward the downstream edge. The slower rate of movement of conveying means 12 in relation to the rate of movement of the articles toward it across the air table causes articles to start to accumulate along the center line 38 of the table. However, movement of the articles on the air cushion is so friction free that they virtually slide around one another with the most minimal contact, into as many columns as the guide rails accommodate. The angulation of the air jets relative to the axis 38 helps to minimize article-to-article contact; articles lying even slightly off axis as they come on to the air table are directed toward one or the other of the outer outgoing lines 41 or 43.

The positioning pegs 58 assure that the articles 13 are in accurately defined lines as they are discharged onto the triple line conveyor 12.

Because the articles 13 are floating on a directionalized air cushion, they tend to distribute themselves between the several outlet lines 41, 42, 43 with almost negligible article-to-article contact and, therefore, with a minimum of abrasion. This attribute of the apparatus 10 makes it particularly useful with tapered glass articles, as shown, and with glass beverage containers where side wall abrasions could establish focal points for damage.

The apparatus shown forms a single line of incoming articles into three ongoing lines. From the foregoing description, it will be apparent that the invention can be used to arrange incoming articles into other numbers or arrangements of lines.

Having described in detail the preferred embodiment of my invention, what I desire to claim and protect by Letters Patent is:

1. A pneumatic article spreader for arranging incoming discrete articles such as glass containers which are moving in single line relation, into at least two ongoing moving lines, said spreader comprising, an air table having a multiplicity of air outlet ports in a generally horizontal transfer area thereof, conduit means for supplying pressure air to said ports, said ports in use providing an air cushion over said transfer area on which said articles float when moving thereover, said ports being angulated, with respect to vertical, toward the downstream direction, to move the articles in the downstream direction, the ports which lie to the side of the central longitudinal axis of said transfer area being angulated away from said axis to direct articles moving thereover downstream and away from the line of the incoming articles, guide rails defining the side limits of the transfer area of said air table, at least one positioning peg above said transfer area and preventing movement of articles through its position, said peg being positioned relative to said guide rails to direct articles moving on said air table into lines on either side of the peg, a cover above and extending substantially over the entire transfer area, said cover being spaced above the tops of the articles such that upstanding articles can pass unrestrainedly between said area and cover but such that said cover prevents said articles from falling over, and means supporting said peg so that said peg depends below said cover and into the paths of travel of articles moving on said area.

2. A pneumatic spreader as set forth in claim 1 wherein the multiplicity of ports in said transfer area are arranged at least into a right-hand apron and a left-hand apron, said aprons being divided one from the other at the central axis of said transfer area, said ports in each apron being angulated downstream and outwardly away from said central axis.

3. An article spreader in accordance with claim 1 wherein said peg depends from said cover.

4. An article spreader in accordance with claim 1 wherein said cover is vertically adjustable relative to the transfer area of said air table for positioning to accommodate articles of different heights.

5. A pneumatic article spreader for arranging incoming discrete articles such as glass containers which are moving in single line relation, into at least two ongoing moving lines, said spreader comprising, an air table having a multiplicity of air outlet ports in a generally horizontal transfer area thereof, conduit means for supplying pressure air to said ports, said ports in use providing an air cushion over said transfer area on which said articles float when moving thereover, said ports being angulated, with respect to vertical, toward the downstream direction, to move the articles in the downstream direction, the ports which lie to the side of the central longitudinal axis of said transfer area being angulated away from said axis to direct articles moving thereover downstream and away from the line of the incoming articles, the multiplicity of ports in said transfer area being arranged at least into a right-hand apron and a left-hand apron, said aprons being divided one from the other at the central axis of said transfer area, said ports in each apron being angulated downstream and outwardly away from said central axis, said multiplicity of ports including ports arranged into a triangular central apron, the base of said central apron being at the downstream end of said air table and the apex of said central apron pointing upstream to the center of said transfer area, the air ports in said central apron being angulated downstream but parallel to the central axis of said transfer area.

6. A pneumatic spreader adapted to be positioned between an upstream single line conveyor and a downstream multiple line conveyor, said spreader functioning to receive a series of similar discrete articles such as glass containers incoming in a single line to arrange them into at least two lines and to discharge them onto the multiple line conveyor, said spreader comprising a table positioned between said conveyors over which said articles pass as they move from said single line conveyor to said multiple line conveyor, the conveying surface of said table being in substantially the same horizontal plane as the surfaces of said conveyors, a multiplicity of air outlet ports in said table angulated downstream and outwardly on either side of the center line thereof, means for supplying pressure air to said ports, guide rails defining the side limits of the conveying area of said table, a cover above the conveying surface of said table, said cover being dimensioned and positioned to overlie the conveying area, and said cover being slightly above the tops of the articles to be conveyed so that said articles do not contact said cover unless they start to tip over, and at least one positioning peg depending from the underside of said cover, said peg being symmetrically positioned above the downstream end of said table relative to the guide rails at that end.

7. A pneumatic spreader as set forth in claim 6 wherein the multiplicity of ports in said table are arranged at least into a left-hand apron and a right-hand apron, said aprons being separated from one another at the center axis of said table, the air ports in each apron being angulated downstream toward said multiple line conveyor and outwardly toward the guide rail adjacent that apron.

* * * * *